Aug. 13, 1963 K. A. AUSTIN ETAL 3,100,378
AUXILIARY POWER DRIVE MECHANISM FOR A GAS TURBINE ENGINE
Filed Nov. 14, 1960 4 Sheets-Sheet 1

INVENTORS.
KENNETH A. AUSTIN.
BY WILLIAM O'CONNOR.

ATTORNEYS.

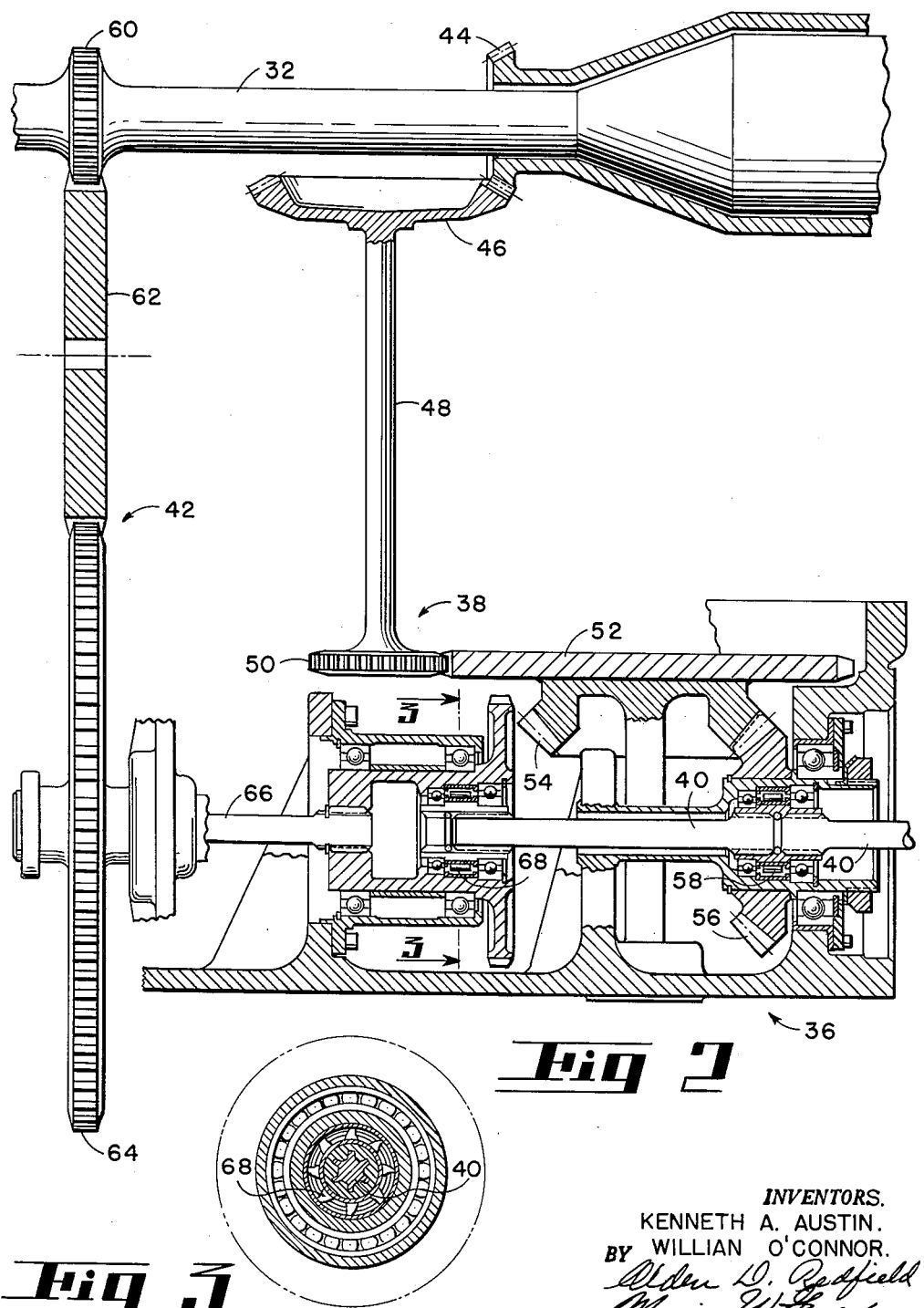

United States Patent Office 3,100,378
Patented Aug. 13, 1963

3,100,378
AUXILIARY POWER DRIVE MECHANISM FOR A GAS TURBINE ENGINE
Kenneth A. Austin, Bridgeport, and William O'Connor, Westport, Conn., assignors to Avco Corporation, Stratford, Conn., a corporation of Delaware
Filed Nov. 14, 1960, Ser. No. 69,063
4 Claims. (Cl. 60—39.16)

This invention relates to auxiliary power drive mechanism for a gas turbine engine.

Gas turbine engines of the so-called free-power turbine type to which this invention applies, employ two independently rotatable turbines, one turbine driving the air compressor, sometimes called gas producer turbine, and the other turbine being designated a power turbine as it drives the primary power output shaft from the engine. Preferably, these two turbines are adjacent each other in a two-stage arrangement, one common design using the gas producer turbine as the first stage and the adjacent power turbine as a second stage through which the hot gasses are passed in such a two-stage turbine arrangement. In this arrangement the power shaft for the power turbine is located inside the hollow shaft driving the compressor from the gas producer turbine if the power output is to be from the front of the engine. However, in a rear drive arrangement of this type of engine the shaft from the gas producer turbine to the compresso goes forward and the power shaft goes rearward from the turbine section of the engine.

In view of the fact that with this type of free-power gas turbine engine the speed of rotation of the power turbine is often variant in an amount which would not be satisfactory for continuous driving of accessories necessary with the engine, it has been a common practice in the past to drive these accessories from the gas producer turbine shaft. Such accessory power adds to the output load and causes an increases in turbine inlet temperature, a factor that directly affects the blade life of the engine. Since the efficiency of a turbine increases with operating temperature, the design point is always as high as the blade material wall allow for a given life. The material is thus approaching critical conditions, and a relatively small further increase in temperature will result in a severely limited life expectancy. Thus, accessory loads which can be tolerated at low power and temperature will have a severe, adverse effect when imposed on an engine producing maximum output.

For a given temperature rise, about twice the power can be extracted from the power turbine shaft compared to the gas producer rotor. Furthermore, the characteristics of the gas producer and power turbine (FIGURE 6) are such that both deliver the majority of their power above their 70% speed points. These two factors are recognized and used to advantage in this invention.

It is therefore a primary object of this invention to relieve the gas producer turbine in a free-power engine from some of the continuous load for driving accessories and to transfer this load through a system of gears, shafts and overrunning clutches to the power turbine shaft and to return it to the gas producer shaft upon slowing down of the power turbine shaft.

It is a further object to reduce the temperature rise in the turbine section of an engine under conditions of relatively high power requirements for the accessories, and to thereby improve the performance of both the accessories and the gas turbine engine.

It is another object of the modified form of this invention to provide with a rear power output, a closely grouped rugged assembly of accessory drive and power drive from the engine combined with the advantages of selective use of power turbine and gas producer turbine drive to increase the efficiency of drive for the accessories.

The above and other objects of the invention will be apparent from the following more detailed description and by reference to the accompanying drawings forming a part hereof and wherein:

FIG. 2 is a sectional view of the accessory drive mechanism of the type shown in FIG. 1.

FIG. 3 is a section taken on the line 3—3 of FIG. 2 and shows the overrunning clutch connection from the power turbine shaft gear train to the accessory drive shaft, a like overrunning clutch being employed from the gas producer turbine shaft gear train to the accessory drive shaft.

Figure 1:
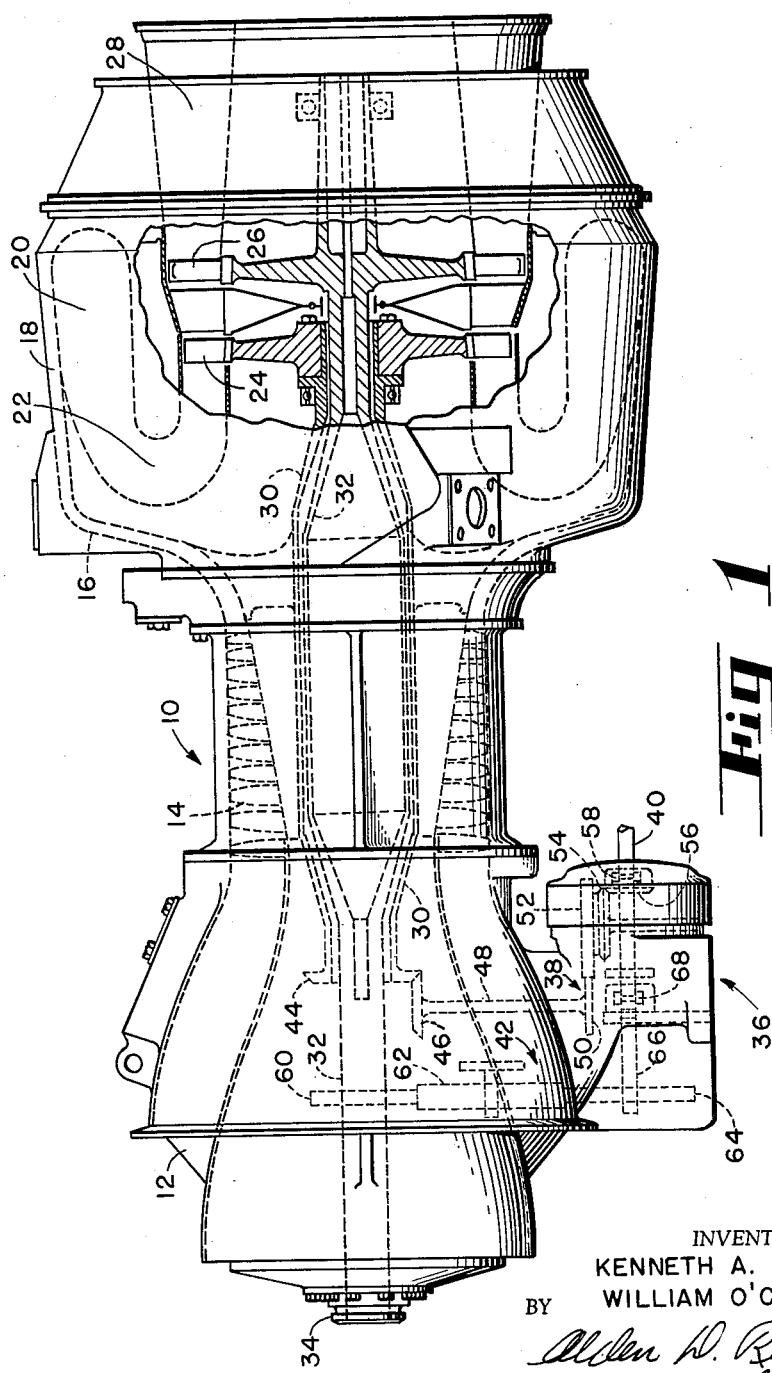
FIG. 1 is a view partly in section of a gas turbine engine with the accessory drive mechanism of this invention.

Referring to the drawings, there is shown in FIG. 1 a gas turbine engine 10 with an air inlet 12 near the front of the engine which provides for an inlet of air to a compressor 14 which feeds air into a radial diffuser 16 and an annular combustor 18 from which the air thus compressed is fed into a combustion chamber 20 where it is mixed with fuel and ignited, and the resulting gasses are directed through suitable annular passages 22, first against a gas producer turbine 24 and subsequently in a second stage into a second or power turbine 26, the gas subsequently being ejected at the rear of the engine through an outlet 28. The gas producer turbine 24 drives the compressor 14 through a gas producer turbine shaft 30 and the power turbine 26 drives a power turbine shaft 32 which is enclosed within but independently rotatable relative to the gas producer turbine shaft 30. The power turbine shaft extends forwardly through the center of the engine to a power outlet 34 after having been carried through suitable gearing for reducing the rotative speed thereof, not shown here, it being understood that the propeller, or like power using facility being provided at 34, the power outlet at 34 being the primary power outlet from the engine.

Referring now more particularly to FIG. 2 and generally to FIG. 1, the auxiliary power drive mechanism assembly, generally designated as 36, is located adjacent the engine and has two drive connections from the engine, as follows: a gas producer drive connection 38 from the gas producer turbine shaft 30 to the auxiliary drive shaft 40 and a power turbine drive connection 42 from the power turbine shaft 32 to the auxiliary drive shaft 40. The aforesaid gas producer drive connection 38 is made up of gears 44, 46, from shaft 30 to shaft 48, and gears 50, 52, 54 and 56 which complete the drive connection from the gas producer turbine shaft 30 to the auxiliary drive shaft 40 through overrunning clutch 58. The drive to the shaft 40 is therefore only in one direction, in view of the structure of the overrunning clutch 58 which is a clutch similar in cross section to that shown in FIG. 3.

The power turbine drive connection 42 is made up of gears 60, 62 and 64. The stub shaft 66 connects with the auxiliary drive shaft 40 through the overrunning clutch 68 which assures that the drive to such shaft through the power turbine drive connection 42 will be only in one direction.

Figure 6:
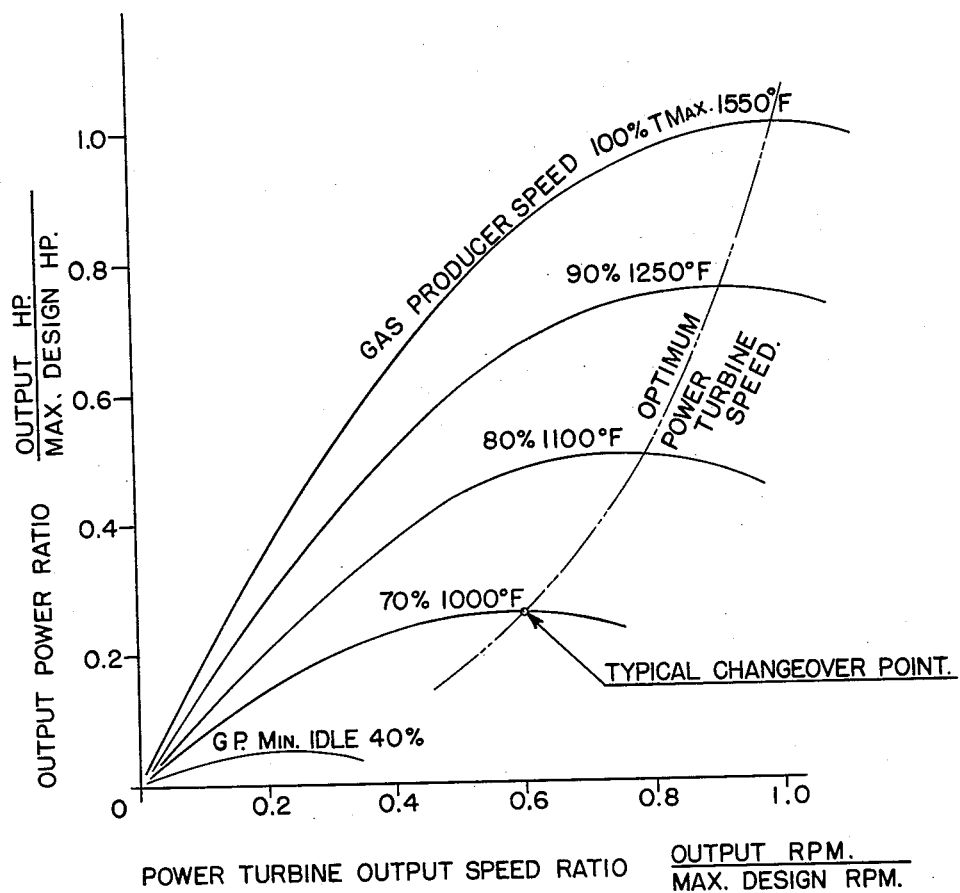
FIG. 6 is a diagram showing a typical relationship of gas producer and power turbine characteristics for the engine referred to in this invention.

The relative reduction gear ratio of the two gear trains is chosen so that above a certain gas producer/power turbine speed ratio (see typical example, FIGURE 6) the power turbine drive will rotate shaft 40 through overrunning clutch 68 at a faster speed than that achieved by the gas producer drive to overrunning clutch 58. In this manner, the accessory load is advantageously taken over by the power turbine for the majority of the power operation of the engine.

The gear reduction effected by the gas producer turbine drive connection, above detailed, is such that with a maximum gas producer turbine rotative speed of 23,725 r.p.m., the resulting speed of rotation imposed by the drive connection 38 on the shaft 40, is 3,050 r.p.m.

The power turbine drive connection 42, made up of gear train 60, 62, and 64, reduces, in the illustrative structure, the rotative speed of power turbine shaft 32 at a max of 18,900 r.p.m., to a rotative speed of stub shaft 66 of 4,000 r.p.m.

The gas producer turbine drive connection 38 from the gas producer turbine shaft 30 thus reduces the $N_1$ max of 23,725 to 3,050 r.p.m. at the output shaft 40. Likewise, the power turbine drive connection 42 reduces the max r.p.m. of 18,900 at the power turbine shaft 32 to 4,000 r.p.m. at the auxiliary drive shaft 40. In each case the connection to the drive shaft 40 is accomplished by a one-way drive, the one-way drive or overrunning clutch 58 in the case of the gas producer turbine drive connection 38 and the one-way drive or overrunning clutch 68 in the case of the power turbine drive connection 42, so the drive connection at the output shaft, either 38 or 42, which is rotating at the greatest speed will pick up the load and will cause drive of the shaft 40 for driving accessories at the speed of the drive connection picking up the load. It is noted that with the gear ratios as above set forth, in considering the maximum r.p.m.'s enumerated the speed induced at the accessory drive shaft 40 for the maximum gas producer r.p.m. is 75% of the speed induced at the auxiliary drive shaft 40 for maximum power turbine r.p.m. Therefore, there is a major weight imposed of substantially 4 to 3 so that drive by the power turbine will be assured, unless the power turbine speed is materially reduced, and, in such case, provided the power turbine induced speed goes below the gas producer induced speed at the shaft 40, then the gas producer will take over the drive. However, as long as the speed of rotation of the power turbine is well in the upper half of its speed range of rotation (approximately upper 40%), then the drive by the power turbine will be assured with its better efficiency made available in such range.

Figure 4:
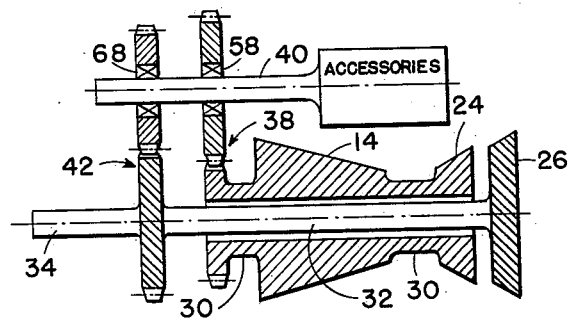
FIG. 4 is a diagrammatic showing of the arrangement of turbines and auxiliary power output drive mechanism as applied to the so-called front drive arrangement with a gas turbine engine.
Figure 5:
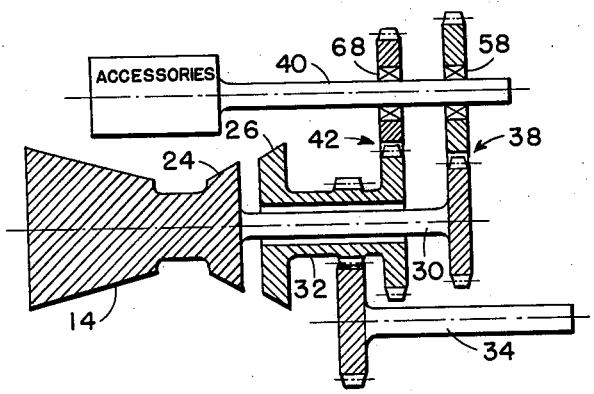
FIG. 5 is a diagrammatic showing of the arrangement of turbines and auxiliary power output drive mechanism as applied to a so-called rear drive arrangement with a gas turbine engine.

Referring to FIGS. 4 and 5, there are shown diagrammatic layouts of two arrangements of auxiliary drive, the arrangement of FIG. 4 showing in diagrammatic form the above described auxiliary power drive mechanism, while FIG. 5 shows a modified form of the invention whereby the auxiliary power drive mechanism is shown for a rear drive gas turbine unit. In this case the gas producer turbine drive to the compressor is forward, while a separate auxiliary drive shaft from the gas producer turbine extends through a hollow shaft which carries the power turbine drive, and separate gears are provided for the auxiliary drive connections from the power turbine and the gas producer turbine, as shown. The primary engine output shaft is connected to the power turbine hollow shaft by suitable gearing. In this type of arrangement a very rugged and compact drive mechanism for both primary and auxiliary power can be accomplished.

In the illustrative structure a mechanism suitable to accomplish the principles of the invention has been disclosed, but it is intended that equivalent modified forms of the invention may be employed and such modifications are intended within the scope of the following claims.

We claim:
1. In an accessory drive for a gas turbine engine of the type employing a power turbine and a gas producer turbine mounted for rotation independently of each other with a power turbine shaft driven by said power turbine and a separate gas producer turbine shaft driven by said gas producer turbine, gas directing means for impelling said turbines and affording a range of rotative speeds at varying power outputs downward from a design maximum rotative speed for each of said turbines, the combination therewith of an accessory drive means comprising:

an accessory drive shaft;

a first rotatable connection from said power turbine shaft to said accessory drive shaft, including a first rotative speed reducing gear train and a first one-way drive connection;

a second rotatable drive connection from said gas producer turbine shaft also to said accessory drive shaft and including a second rotative speed reducing gear train, and a second one-way drive connection between said second gear train and said accessory drive shaft;

each of said first and second one-way drive connections being positioned between its respective gear train and said accessory drive shaft, whereby the greater speed of rotation imposed on said accessory shaft by either said first or second one-way drive connection will impart rotation to said accessory shaft;

said first gear train and second gear train having designed relative speed reducing ratios producing substantially greater speed of rotation at said first one-day drive connection over said second one-way drive connection when said power turbine and said gas producer turbine are rotating at their said respective maximum designed speeds of rotation;

thereby to assure drive of said accessory shaft by said power turbine when said power turbine speed exceeds the speed of said gas producer by a predetermined amount and only shifting drive to said gas producer turbine when speed of rotation of said power turbine is reduced below said predetermined amount relative to the speed of rotation of said gas producer turbine and shifting said drive to said gas producer turbine in the lower portion of the speed range of said power turbine when speed of rotation of said power turbine is not substantially higher than that of said gas producer turbine.

2. Mechanism as in claim 1 in which the said designed relative speed reducing ratios of said first gear train and said second gear train have values producing a ratio of speed of rotation at said first one-way drive connection over the speed of rotation at said second one-way drive connection in substantially the ratio of 4 to 3 under conditions when said power turbine and said gas producer turbine are rotating at their respective design maximum speeds of rotation.

3. Mechanism as in claim 1 in which the said designed relative speed reducing ratios of said first gear train and said second gear train have values producing a speed of rotation at said first one-way drive connection substantially greater than the speed of rotation at said second one-way drive connection over a substantial portion of the upper half of the speed range of said power turbine.

4. Mechanism as in claim 1 in which the said designed relative speed reducing ratios of said first gear train and said second gear train have values producing a speed of rotation at said first one-way drive connection substantially greater than the speed of rotation at said second one-way drive connection over substantially the upper 40 percent of the speed range of said power turbine.

References Cited in the file of this patent
UNITED STATES PATENTS

| | | |
|---|---|---|
| 2,195,139 | Waseige | Mar. 26, 1940 |
| 2,573,011 | Gruber | Oct. 30, 1951 |
| 2,723,531 | Wosika et al. | Nov. 15, 1955 |
| 2,770,149 | Losey | Nov. 13, 1956 |
| 2,852,912 | Kelley | Sept. 23, 1958 |
| 2,984,975 | Rodgers | May 23, 1961 |